(12) United States Patent
Khalili et al.

(10) Patent No.: US 12,444,084 B1
(45) Date of Patent: Oct. 14, 2025

(54) VEHICLE VISION SYSTEM INCLUDING CAMERA TO GROUND ALIGNMENT USING BIRD'S EYE VIEW IMAGE

(71) Applicant: GM GLOBAL TECHNOLOGY OPERATIONS LLC, Detroit, MI (US)

(72) Inventors: Mohsen Khalili, Sterling Heights, MI (US); Xinyu Du, Oakland Township, MI (US); Yao Hu, Sterling Heights, MI (US); Hao Yu, Troy, MI (US); Xiaobo Guo, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/752,148

(22) Filed: Jun. 24, 2024

(51) Int. Cl.
  *G06T 7/80* (2017.01)
  *G06T 5/80* (2024.01)
  *G06T 7/246* (2017.01)

(52) U.S. Cl.
  CPC ............. *G06T 7/80* (2017.01); *G06T 5/80* (2024.01); *G06T 7/248* (2017.01); *G06T 2207/30252* (2013.01)

(58) Field of Classification Search
  CPC .. G06T 7/248; G06T 7/80; G06T 7/85; G06T 5/80; G06T 2207/30252; H04N 17/002
  See application file for complete search history.

(56) References Cited

U.S. PATENT DOCUMENTS

| | | | |
|---|---|---|---|
| 8,373,763 B2 | 2/2013 | Zhang et al. | |
| 9,811,946 B1 * | 11/2017 | Hung | G06T 3/4038 |
| 11,017,499 B2 * | 5/2021 | Viswanathan | G06T 7/97 |
| 2009/0015675 A1 * | 1/2009 | Yang | G06T 7/246 |
| | | | 348/148 |
| 2010/0246901 A1 * | 9/2010 | Yang | B60R 1/26 |
| | | | 382/154 |
| 2012/0002057 A1 * | 1/2012 | Kakinami | G06T 7/85 |
| | | | 348/E17.002 |
| 2015/0254872 A1 * | 9/2015 | de Almeida Barreto | |
| | | | G06T 3/18 |
| | | | 382/103 |
| 2017/0120817 A1 * | 5/2017 | Kuehnle | H04N 23/698 |
| 2018/0063440 A1 * | 3/2018 | Kopf | H04N 23/683 |
| 2019/0102868 A1 * | 4/2019 | Beric | H04N 25/61 |
| 2019/0370589 A1 * | 12/2019 | Kwon | G06T 7/80 |

(Continued)

OTHER PUBLICATIONS

U.S. Appl. No. 18/741,218, filed Jun. 12, 2024, Du et al.
U.S. Appl. No. 18/741,353, filed Jun. 12, 2024, Guo et al.

*Primary Examiner* — Brian P Yenke (57) ABSTRACT

A vision system for a vehicle includes a camera configured to generate one of distorted and undistorted images. An alignment system is configured to generate a region of interest (ROI) for the camera, generate a bird's eye view (BEV) homography to convert undistorted points in the ROI to BEV points, generate a BEV image based on the one of distorted and undistorted images and one of the BEV homography and an updated BEV homography, adaptively update the BEV homography to generate the updated BEV homography, detect current locations of features in the BEV image, predict future locations of the features for a next BEV image, compare the current locations of the features in the BEV image with prior predicted locations, and convert the BEV points in the BEV image to an undistorted points in a perspective undistorted image using an inverse of the updated BEV homography.

20 Claims, 7 Drawing Sheets

(56) References Cited

U.S. PATENT DOCUMENTS

| | | | |
|---|---|---|---|
| 2020/0027243 A1* | 1/2020 | Ziegler | H04N 13/246 |
| 2020/0202540 A1* | 6/2020 | Wang | B60K 35/22 |
| 2020/0232800 A1* | 7/2020 | Bai | G01C 21/3848 |
| 2022/0012466 A1* | 1/2022 | Taghavi | G06F 18/2163 |
| 2023/0052842 A1* | 2/2023 | Cai | G06T 7/70 |
| 2023/0215026 A1* | 7/2023 | Du | H04N 23/90 701/25 |
| 2023/0256975 A1* | 8/2023 | Li | B60W 40/10 701/1 |
| 2023/0260157 A1 | 8/2023 | Li et al. | |
| 2023/0260291 A1 | 8/2023 | Li et al. | |
| 2024/0020953 A1* | 1/2024 | Park | G06V 20/56 |
| 2024/0273741 A1* | 8/2024 | Du | G06T 7/337 |
| 2024/0276100 A1* | 8/2024 | Li | G06V 10/56 |
| 2024/0370971 A1* | 11/2024 | Arar | G06T 3/4038 |
| 2024/0424988 A1* | 12/2024 | Burns | B60R 1/28 |
| 2024/0426623 A1* | 12/2024 | Gamalath | H04N 5/2624 |
| 2024/0428545 A1* | 12/2024 | Venkatachalapathy | G06V 10/16 |
| 2024/0430574 A1* | 12/2024 | Burns | H04N 23/90 |

\* cited by examiner

VEHICLE VISION SYSTEM INCLUDING CAMERA TO GROUND ALIGNMENT USING BIRD'S EYE VIEW IMAGE

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to camera systems for vehicles, and more particularly to alignment of the camera to the ground using bird's eye view (BEV) images.

Vehicles may include one or more cameras that generate images that are used in conjunction with driver assistance systems such as parking assistance systems and/or autonomous driving systems. These systems can identify objects in the images and determine positions of the objects relative to the moving vehicle. To ensure valid data is generated, the one or more cameras are aligned relative to the ground.

SUMMARY

A vision system for a vehicle includes a camera configured to generate one of distorted and undistorted images. An alignment system is configured to generate a region of interest (ROI) for the camera, generate a bird's eye view (BEV) homography to convert undistorted points in the ROI to BEV points, generate a BEV image based on the one of distorted and undistorted images and one of the BEV homography and an updated BEV homography, adaptively update the BEV homography to generate the updated BEV homography, detect current locations of features in the BEV image, predict future locations of the features for a next BEV image, compare the current locations of the features in the BEV image with prior predicted locations, and convert the BEV points in the BEV image to an undistorted points in a perspective undistorted image using an inverse of the updated BEV homography.

In other features, the alignment system is configured to adaptively update the BEV homography by calculating alignment of the camera based on the detected current locations and the prior predicted locations. The alignment system is configured to adaptively update the BEV homography by determining a plurality of feature alignment values based on the detected current locations and the prior predicted locations. The alignment system is configured to adaptively update the BEV homography by calculating a deviation measurement of the plurality of feature alignment values.

In other features, the alignment system is configured to adaptively update the BEV homography by calculating a function of the plurality of feature alignment values when the deviation measurement is less than a predetermined threshold. The alignment system is configured to use the function to update one of the BEV homography and the updated BEV homography when the deviation measurement is less than a predetermined threshold. The alignment system is configured to not update one of the BEV homography and the updated BEV homography when the deviation measurement is greater than a predetermined threshold.

In other features, the alignment system is configured to adaptively update a feature tracking condition prior to calculating alignment of the camera based on the detected current locations and the prior predicted locations. The alignment system is configured to adaptively update an enabling condition prior to calculating alignment of the camera based on the detected current locations and the prior predicted locations. The alignment system is configured to use a first ROI during one portion of an alignment iteration and a second ROI during another portion of an alignment iteration, wherein the first ROI is different than the second ROI.

In other features, the alignment system is configured to use an adaptive variable based on a default variable, a relaxed variable, a number of results generated, and a predetermined number of results for adaptation.

A method for aligning a camera of a vision system for a vehicle to ground includes generating a region of interest (ROI) for a camera, generating a bird's eye view (BEV) homography to convert undistorted points in the ROI to BEV points, generating a BEV image based on the one of distorted and undistorted images and one of the BEV homography and an updated BEV homography, adaptively updating the BEV homography to generate the updated BEV homography, detecting current locations of features in the BEV image, predicting future locations of the features for a next BEV image, comparing the current locations of the features in the BEV image with prior predicted locations, and converting the BEV points in the BEV image to an undistorted points in a perspective undistorted image using an inverse of the updated BEV homography.

In other features, the method includes adaptively updating the BEV homography by calculating alignment of the camera based on the detected current locations and the prior predicted locations. The method includes adaptively updating the BEV homography by determining a plurality of feature alignment values based on the detected current locations and the prior predicted locations.

In other features, the method includes adaptively updating the BEV homography by calculating a deviation measurement of the plurality of feature alignment values. The method includes adaptively updating the BEV homography by calculating a function of the plurality of feature alignment values when the deviation measurement is less than a predetermined threshold.

In other features, the method includes using the function to update one of the BEV homography and the updated BEV homography when the deviation measurement is less than a predetermined threshold, and not updating one of the BEV homography and the updated BEV homography when the deviation measurement is greater than a predetermined threshold.

In other features, the method includes adaptively updating a feature tracking condition prior to calculating alignment of the camera based on the detected current locations and the prior predicted locations. The method includes adaptively updating an enabling condition prior to calculating alignment of the camera based on the detected current locations and the prior predicted locations.

In other features, the method includes using a first ROI during one portion of an alignment iteration and a second ROI during another portion of an alignment iteration, wherein the first ROI is different than the second ROI.

In other features, the method includes using an adaptive variable based on a default variable, a relaxed variable, a number of results generated, and a predetermined number of results for adaptation.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Camera to ground alignment is important for perception and motion planning of vehicles. Existing camera to ground alignment solutions suffer from a lack of robust feature matching between image frames in some scenarios. Therefore, the convergence time and accuracy are degraded.

Systems and methods according to the present disclosure provide highly fast and robust camera to ground alignment by transforming images from 3D to bird's eye view (BEV) images for further processing to improve feature matching accuracy. The systems and methods use automatic and flexible regions of interest (ROIs) selected in the vehicle frame of reference, and multi region of interest to reduce the effect of road bank angle and/or curbs on the alignment results. The systems and methods provide improved computational efficiency due to a smaller image and pixel-to-world linear relationship.

Figure 1:
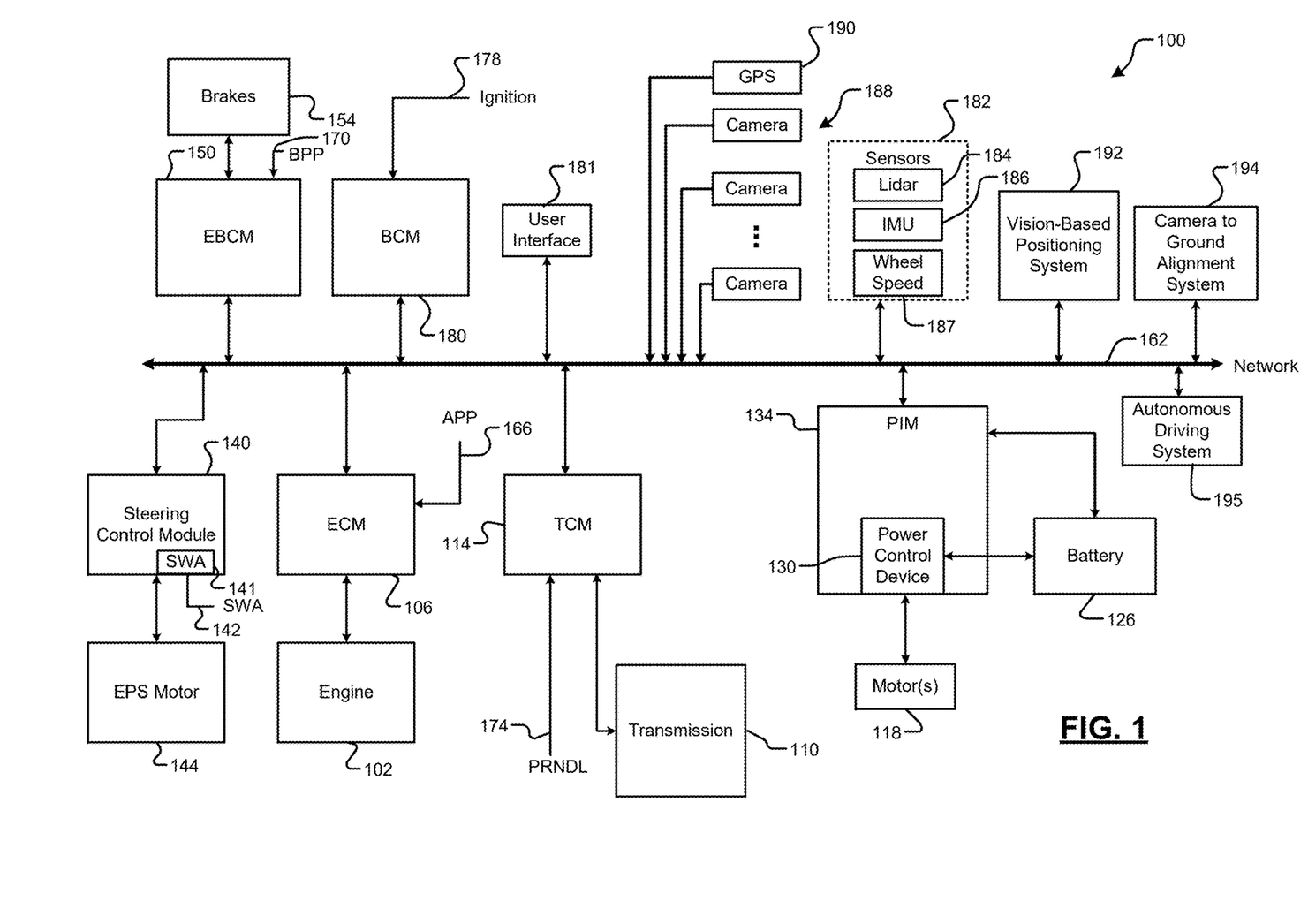
FIG. 1 is a functional block diagram of an example of a vehicle including a camera to ground alignment system according to the present disclosure.

Referring now to FIG. 1, a functional block diagram of an example vehicle control system 100 is presented. While an example of a vehicle control system for a hybrid vehicle is shown and described, the present disclosure is also applicable to other vehicles such as non-hybrid vehicles, electric vehicles, fuel cell vehicles, autonomous vehicles, and/or other types of vehicles.

The vehicle may include an engine 102 that combusts an air/fuel mixture to generate drive torque. An engine control module (ECM) 106 controls the engine 102 based on driver inputs and/or one or more other torque requests/commands from one or more vehicle control modules. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (such as pure electric vehicles), the engine 102 is omitted.

The engine 102 outputs torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle control system 100 may include one or more electric motors 118. In some examples, the electric motor 118 may be implemented within the transmission 110 and/or separately from the transmission 110. The electric motor 118 can act as either a motor or a generator. When acting as a generator, the electric motor converts mechanical energy into electrical energy. The electrical energy can be used to charge a battery 126 via a power control device (PCD) 130. When acting as a motor, the electric motor generates propulsion torque that may be used to drive the vehicle or supplement or replace torque output by the engine 102. While the example includes one electric motor, the vehicle may not include an electric motor or more than one electric motor.

In some examples, a power inverter control module (PIM) 134 may be used to control the electric motor 118 and the PCD 130. The PCD 130 applies power from the battery 126 to the electric motor 118 based on signals from the PIM 134, and the PCD 130 provides power output by the electric motor 118, for example, to the battery 126.

A steering control module 140 controls steering/turning of wheels of the vehicle, for example, based on the driver turning a steering wheel within the vehicle and/or steering commands from one or more vehicle control modules (e.g., such as the autonomous driving system). A steering wheel angle (SWA) sensor 141 monitors a rotational position of the steering wheel and generates a SWA signal 142 based on the position of the steering wheel. As an example, the steering control module 140 may control vehicle steering via an EPS motor 144 based on the SWA signal 142. An electronic brake control module (EBCM) 150 may selectively control brakes 154 of the vehicle based on the driver inputs and/or one or more other braking requests/commands from one or more vehicle control modules.

Control modules of the vehicle may share parameters via a network 162, such as a controller area network (CAN). The CAN may also be referred to as a car area network. For example, the network 162 may include one or more data buses. Various parameters may be made available by a given control module to other control modules via the network 162.

The driver input may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. For example, the ignition state 178 may be off, accessory, run, or crank.

The vehicle includes a user interface 181 such as a touch screen, buttons, knobs, etc. to allow an occupant to select or deselect driving modes such as autonomous vehicle (AV) and/or advanced driver assistance (ADAS) driving modes. The vehicle may include a plurality of sensors 182 (such as one or more lidar sensors 184, an inertial measurement unit (IMU) 186, one or more wheel speed sensors 187) and a camera system 188 including one or more cameras.

In some examples, the vehicle includes a global positioning system (GPS) 190 to determine a position and trajectory of the vehicle relative to streets and/or roadways.

The vehicle further includes a vision-based positioning system 192 configured to analyze images from the camera system and/or to identify objects in a field of view of the camera system 188. In some examples, one or more of the cameras of the camera system 188 includes a fisheye camera.

The vehicle further includes a camera to ground alignment system 194 configured to align one or more of the cameras to ground. In some examples, an autonomous driving system 195 controls the acceleration, braking and/or steering of the vehicle with limited or no human intervention based on an output of the vision-based positioning system 192, the camera to ground alignment system 194, and/or the GPS 190.

Figure 2:
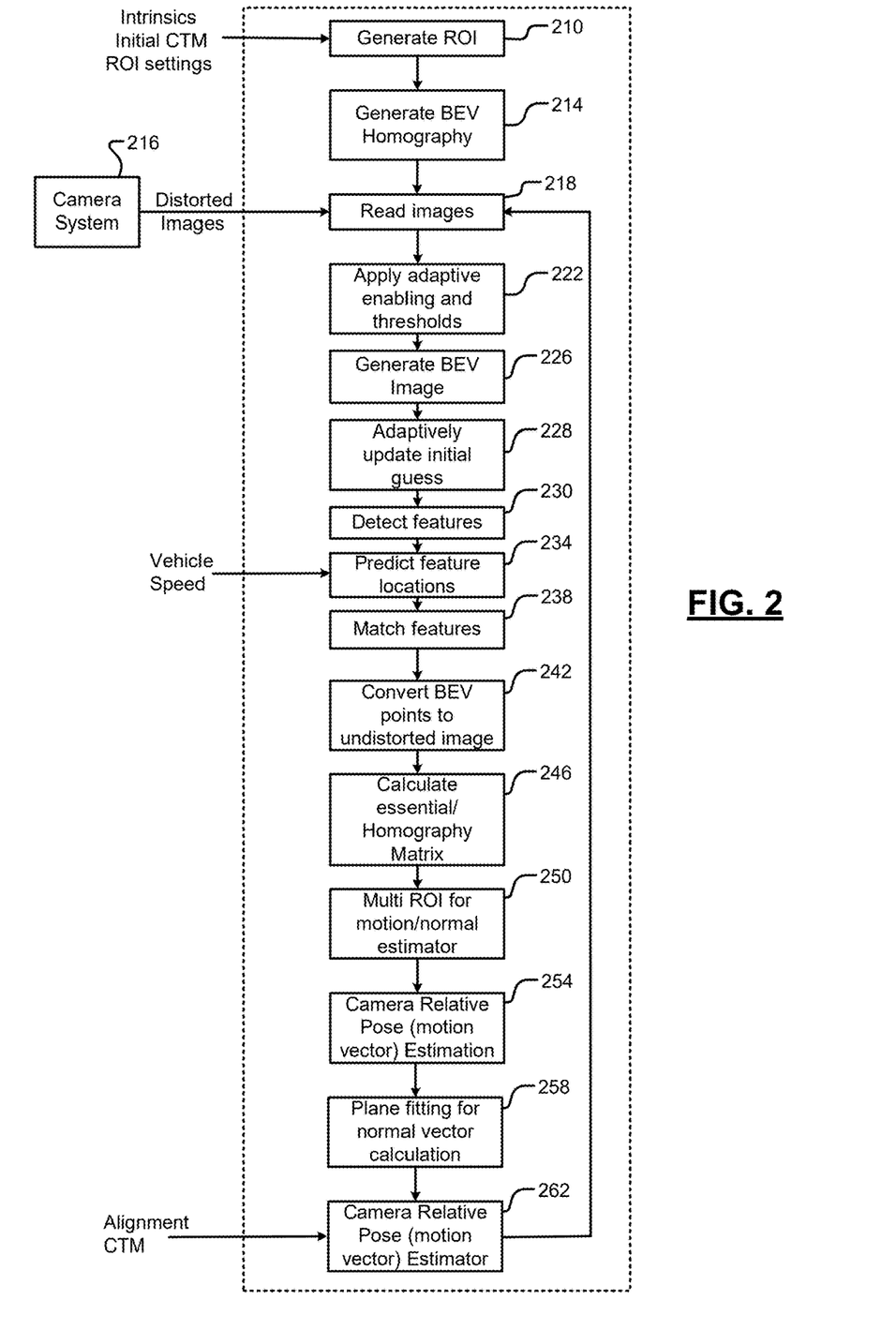
FIG. 2 is a flowchart an example of an alignment method for aligning the camera to ground according to the present disclosure.

Referring now to FIG. 2, operation of the camera to ground alignment system 194 is shown. Each of the cameras may be aligned separately from the other cameras. In some examples, the cameras in response to an event (e.g., after ignition on events). At 210, a region of interest (ROI) is generated based on intrinsics, an initial coordinate transform matrix (CTM), and/or ROI settings. At 214, a BEV homography is generated. The BEV homography transforms points in a portion of a 3D image in the ROI into a BEV image.

At 218, the distorted image is read from a camera system 216. At 222, adaptive enabling and thresholding is performed. In some examples, one or more of the enabling parameters and/or thresholds are adapted (e.g., using a default parameter, a relaxed parameter, and/or a ratio defined by the number of results n over a maximum number of results $n_{max}$ during adaptation) during the alignment process to increase accuracy. Examples of enabling conditions include steering wheel angle (SWA) within a predetermined range, vehicle speed within a predetermined range, etc. Examples of thresholds include feature window size, etc. If enabling conditions are met, a BEV image is generated at 226 using the distorted image and the initial or updated BEV homography matrix. At 228, the initial BEV homography matrix is selectively updated based on a prior iteration.

At 230, features are detected within the BEV image. At 234, locations of the detected features are predicted for a future image sample. For example, movement of the detected features can be estimated based on the sample rate, vehicle speed, and a vehicle motion vector. At 238, prior predicted feature locations associated with a prior image sample are compared to current detected features in the current image sample. At 242, the BEV images are converted to undistorted points using an inverse of the initial or updated BEV homography (e.g., $x = H_p^{-1} y$).

At 246, an essential or homography matrix is calculated. At 250, the ROI can be adjusted between different sizes to provide a multi-ROI for motion/normal estimation. In other words, a wider ROI may be used for some steps and a narrower ROI may be used for other steps. At 254, camera relative pose (motion vector) estimation is performed. At 258, plane fitting is performed for a normal vector calculation. At 262, alignment and maturation are calculated.

Additional details relating to steps 230, 238, 254, 258, and 262 are described further in commonly-assigned U.S. Pat. No. 8,373,763, U.S. patent application Ser. No. 17/651,406, U.S. Patent Publ. No. 2023/0260157, and/or U.S. Patent Publ. No. 2023/0260291, which are hereby incorporated by reference in their entirety.

Figure 3:
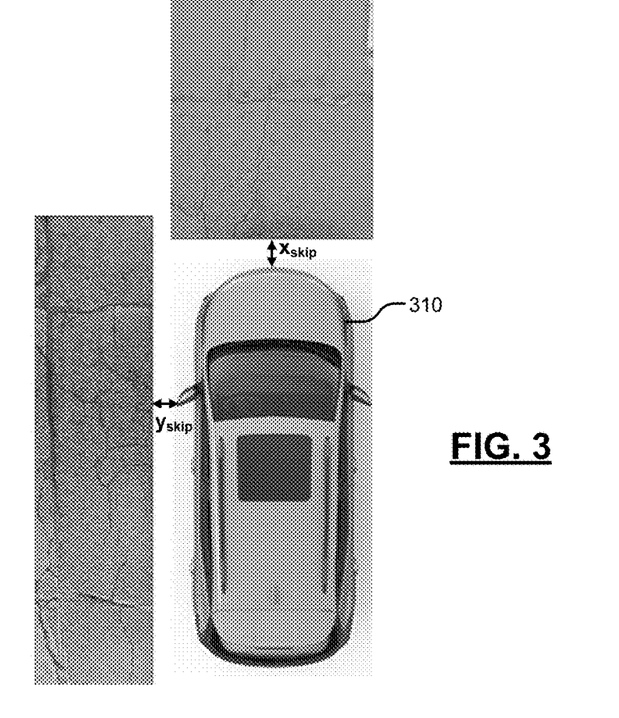
FIG. 3 is a plan view illustrating an example of a region of interest (ROI) in an imaged generated by a camera according to the present disclosure.

Referring now to FIG. 3, initially generating the ROI is shown. Finding a ROI in an original, raw image is challenging since the ROI is curved (e.g., due to a fisheye lens). In addition, the ROI is not robust due to variations in the sensor mounting location. For each camera index i, the ROI for a vehicle 310 is generated as follows:

Initial $CTM: [x_i, y_i, z_i]$

Settings: $x_{length_i}, y_{length_i}, x_{skip_i}, y_{skip_i}$ $$TL_i = \left[ x_i + x_{skip_i} + \frac{x_{length_i}}{2}, y_i + y_{skip_i} + \frac{y_{length_i}}{2}, 0 \right]$$

$$TR_i = \left[ x_i + x_{skip_i} + \frac{x_{length_i}}{2}, y_i + y_{skip_i} - \frac{y_{length_i}}{2}, 0 \right]$$

$$BL_i = \left[ x_i + x_{skip_i} - \frac{x_{length_i}}{2}, y_i + y_{skip_i} + \frac{y_{length_i}}{2}, 0 \right]$$

$$BR_i = \left[ x_i + x_{skip_i} - \frac{x_{length_i}}{2}, y_i + y_{skip_i} - \frac{y_{length_i}}{2}, 0 \right]$$

Where x and y are coordinate positions (z=0 since the alignment system is generating a BEV rather than a 3D image), $x_{skip}$ and $y_{skip}$ are longitudinal and lateral areas, respectively, to be ignored (such as a bumper region), and $x_{length}$ and $y_{length}$ are longitudinal and lateral ranges, respectively, of the ROI.

Figure 4:
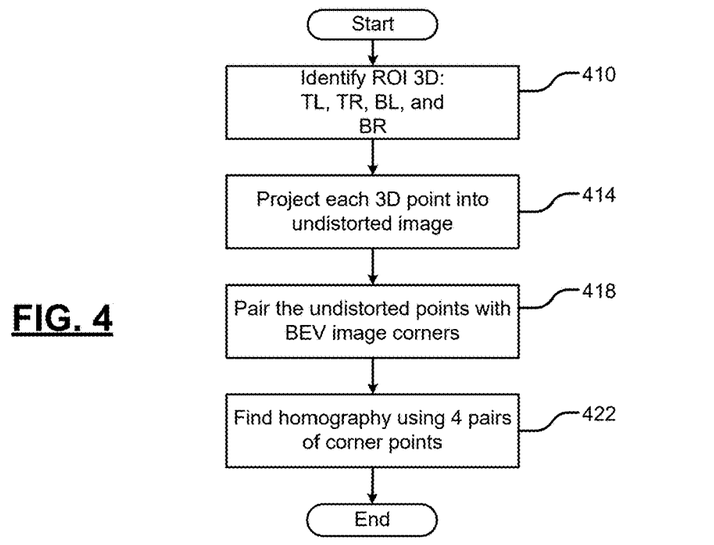
FIG. 4 is a flowchart for an example of a method for generating BEV homography according to the present disclosure.

Referring now to FIG. 4, operation of the BEV homography generator is shown. At 410, the BEV homography generator identifies top left (TL), top right (TR), bottom left (BL), and bottom right (BR) points in the 3D image. At 414, each 3D point is projected into an undistorted image. At 418, the undistorted points are paired with the BEV image corners. At 422, the BEV homography generator 214 generates the BEV homography using the 4 pairs of corner points. The BEV homography is a matrix that transforms a portion of a 3D image in the ROI into a BEV image.

$$y = H_p x = \begin{bmatrix} A & t \\ p^\tau & p \end{bmatrix} x$$

$H_p$ is the projection matrix, x is the homogenous coordinates in the source image, y is the homogenous coordinates in the destination image (BEV), A is a 2×2 non-singular matrix with the linear component, t is the translation component, and $p^\tau$ and p are projective components (in some examples, p is equal to 1). For example, a trapezoidal portion of the 3D image is transformed into a rectangular 2D BEV image.

Figure 5A:
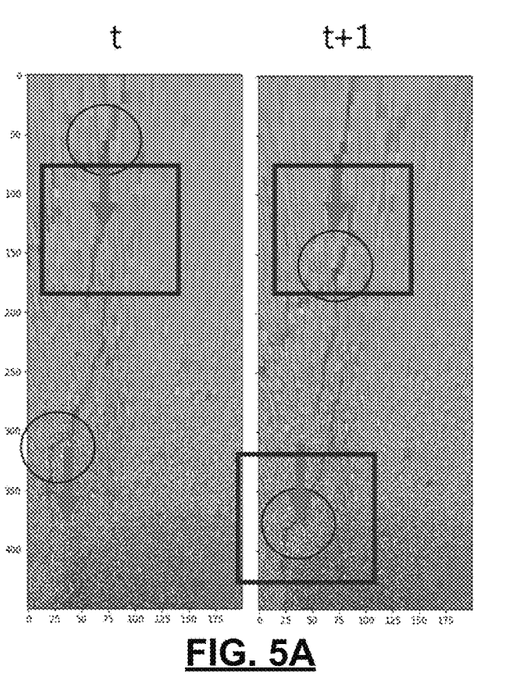
FIGS. 5A and 5B illustrate an example of adaptive adjustment of a parameter such as window size during alignment according to the present disclosure.
Figure 5B:
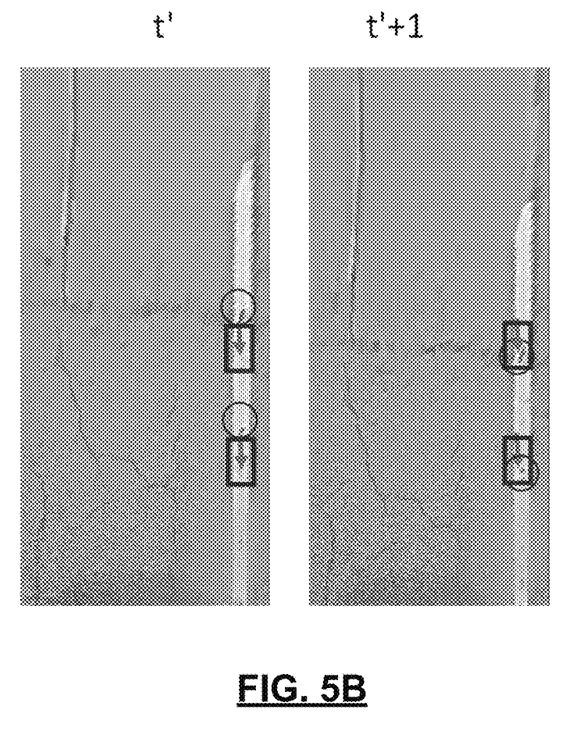

Referring now to FIGS. 5A and 5B, some optical flow parameters (e.g., a given search window size) may improve the results for some images but may make the results much worse for other images. The alignment system according to the present disclosure uses adaptive variables or parameters corresponding to enabling conditions and/or adaptive thresholding for feature tracking. For example, the enabling conditions such as yaw rate and/or forward acceleration are adaptively changed based on the number of results generated. In addition, an optical flow window size width and height, and maximum error tolerated are adaptive based on the number of results generated. For example, larger windows can be used initially and then reduced. In some examples, the parameters are adapted as follows:

$$p = p_d + (p_0 - p_d) * \left( 1 - \frac{n}{n_{max}} \right) \text{ if } 0 \le n \le n_{max}$$

$$p = p_d \text{ if } n > n_{max}$$

p is the adaptive parameter or threshold, $p_d$ is the default parameter, $p_0$ is the relaxed parameter, n is the number of results generated, and $n_{max}$ is the maximum number of results for parameter adaptation. In FIGS. 5A and 5B, the window size for samples at times t and t+1 is compared to a window size for samples at later times t' and t'+1. As can be seen, the window size is reduced for the later samples.

Figure 6:
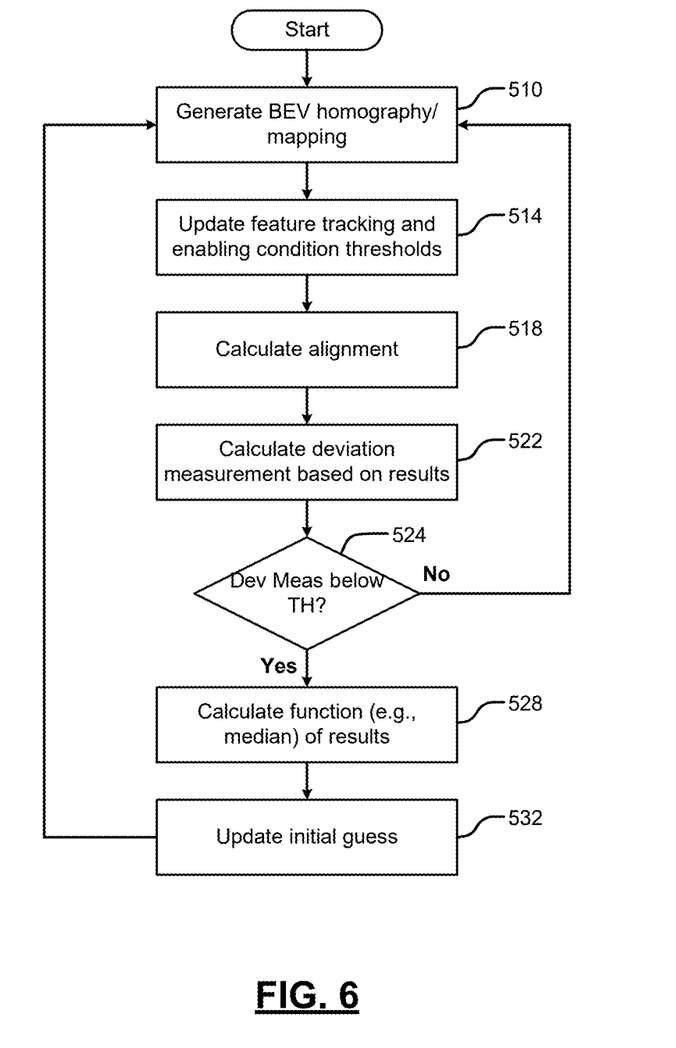
FIG. 6 is a flowchart of an example of a method for updating the BEV homography based on alignment calculation according to the present disclosure.

Referring now to FIG. 6, adaptive updating selectively updates the initial BEV homography. Large initial errors cannot be handled by the state-of-the-art algorithms. The large initial errors cause poor predictions and feature matching. Therefore, very few results are generated, if any. In other words, large initial errors can distort the BEV image which causes bad feature prediction and matching. The alignment system updates the initial guess and BEV homography to improve the BEV image and therefore feature prediction and tracking.

At 510, the BEV homography/mapping is generated. At 514, feature tracking and enabling condition thresholds are updated. At 518, alignment is calculated (a plurality of alignment difference values are generated between predicted locations of features from a prior image sample to actual feature locations in a subsequent image sample). At 522, a deviation measurement such as standard deviation is calculated for the results (e.g., the plurality of alignment difference values). At 524, if the deviation measurement is less than a predetermined threshold (TH), a function such as a median, average, or mid-average is calculated at 528 and the initial guess is updated at 532 based on the function. If the deviation measurement is greater than the threshold, the BEV homography is not updated.

Figure 7:
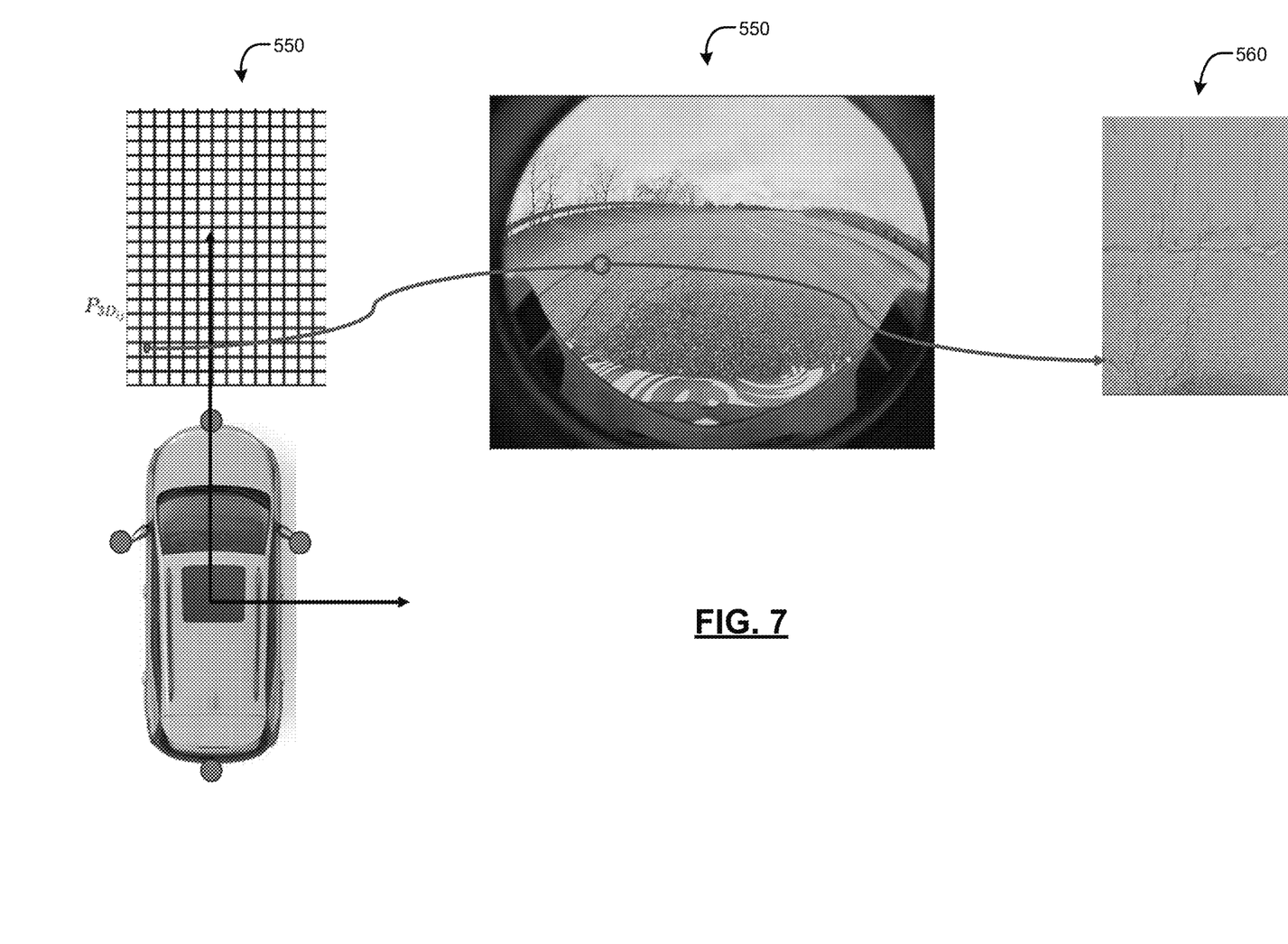
FIG. 7 illustrates an example of mapping of a point in the 3D image to a point in the BEV image according to the present disclosure.

Referring now to FIG. 7, the BEV image generator 226 generates a BEV image at 560 from the 3D grid generated for the desired ROI on the ground at 550 with successively smaller errors as successive iterations are performed. A point $P_{3D_{i,j}}$ in the 3D image is mapped directly to the BEV image $P_{BEV_{i,j}}$=normalized($K*f(D)*T_{init}*P_{3D_{i,j}}$) with reduced distortion as shown where K is the camera matrix, D represents the undistortion parameters, f(.) represents the undistortion map, and T_init is the calibration CTM.

Figure 8:
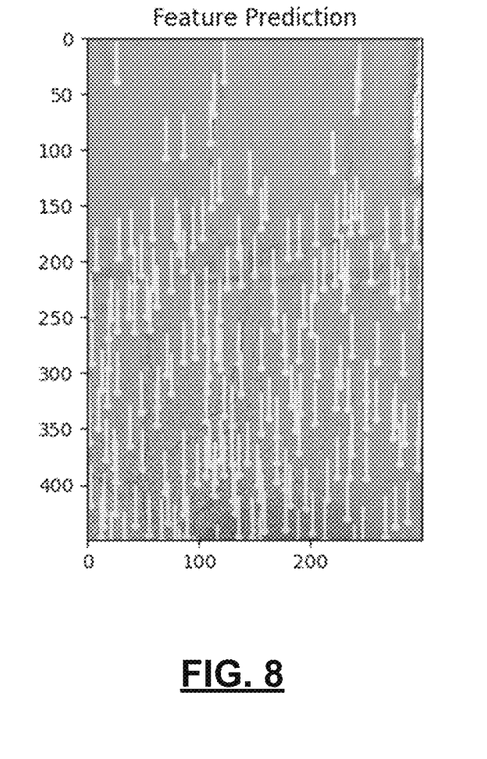
FIG. 8 illustrates an example of feature locations and predicted feature locations according to the present disclosure.

Referring now to FIG. 8, feature prediction in the direction of motion of the vehicle is based on constant pixel to world mapping. In FIG. 8, movement of the features is shown for successive periods. In world to pixel (w2p) mapping, each unit of length in the world is equal to w2p pixels on the BEV image. In other words:

$$w2p = \frac{BEV \text{ image height}}{X_{length}}$$

Vertical prediction of previous image points into the current image for optical flow feature matching estimation is performed.

$$P_{x_{i,j}}^{pred}=P_{x_{i,j}}$$

$$P_{y_{i,j}}^{pred}=P_{x_{i,j}}+\text{round}(Dist*w2p)$$

Figure 9:
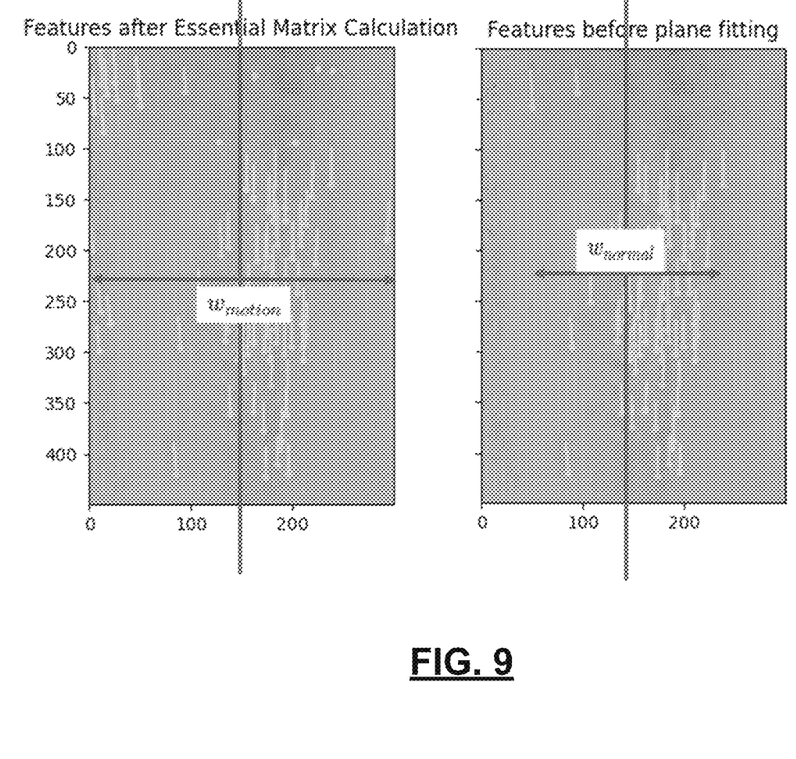
FIG. 9 illustrates an example of varying of the region of interest during different portions of the alignment.

Referring now to FIG. 9, using a narrow ROI, e.g. [−1,1] meters, improves pitch but increases roll error. Using a wider ROI, e.g. [−2,2] meters, improves the roll error but increases pitch error. In some examples, the alignment system uses a multi-ROI approach. For example, the alignment system uses a wider ROI to estimate camera recover pose and a narrower ROI to estimate the normal vector.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vision system for a vehicle comprising:
   a camera configured to generate one of distorted and undistorted images; and
   an alignment system configured to:
      generate a region of interest (ROI) for the camera;
      generate a bird's eye view (BEV) homography to convert undistorted points in the ROI to BEV points;
      generate a BEV image based on the one of distorted and undistorted images and one of the BEV homography and an updated BEV homography;
      adaptively update the BEV homography to generate the updated BEV homography;
      detect current locations of features in the BEV image;
      predict future locations of the features for a next BEV image;
      compare the current locations of the features in the BEV image with prior predicted locations; and
      convert the BEV points in the BEV image to an undistorted points in a perspective undistorted image using an inverse of the updated BEV homography.

2. The vision system of claim 1, wherein the alignment system is configured to adaptively update the BEV homography by calculating alignment of the camera based on the detected current locations and the prior predicted locations.

3. The vision system of claim 2, wherein the alignment system is configured to adaptively update the BEV homography by determining a plurality of feature alignment values based on the detected current locations and the prior predicted locations.

4. The vision system of claim 3, wherein the alignment system is configured to adaptively update the BEV homography by calculating a deviation measurement of the plurality of feature alignment values.

5. The vision system of claim 4, wherein the alignment system is configured to adaptively update the BEV homography by calculating a function of the plurality of feature alignment values when the deviation measurement is less than a predetermined threshold.

6. The vision system of claim 5, wherein:
   the alignment system is configured to use the function to update one of the BEV homography and the updated BEV homography when the deviation measurement is less than a predetermined threshold, and
   not update one of the BEV homography and the updated BEV homography when the deviation measurement is greater than a predetermined threshold.

7. The vision system of claim 2, wherein the alignment system is configured to adaptively update a feature tracking condition prior to calculating alignment of the camera based on the detected current locations and the prior predicted locations.

8. The vision system of claim 2, wherein the alignment system is configured to adaptively update an enabling condition prior to calculating alignment of the camera based on the detected current locations and the prior predicted locations.

9. The vision system of claim 1, wherein the alignment system is configured to use a first ROI during one portion of an alignment iteration and a second ROI during another portion of an alignment iteration, wherein the first ROI is different than the second ROI.

10. The vision system of claim 1, wherein the alignment system is configured to use an adaptive variable based on a default variable, a relaxed variable, a number of results generated, and a predetermined number of results for adaptation.

11. A method for aligning a camera of a vision system for a vehicle to ground, comprising:
   generating a region of interest (ROI) for a camera;
   generating a bird's eye view (BEV) homography to convert undistorted points in the ROI to BEV points;
   generating a BEV image based on the one of distorted and undistorted images and one of the BEV homography and an updated BEV homography;
   adaptively updating the BEV homography to generate the updated BEV homography;
   detecting current locations of features in the BEV image;
   predicting future locations of the features for a next BEV image;
   comparing the current locations of the features in the BEV image with prior predicted locations; and
   converting the BEV points in the BEV image to an undistorted points in a perspective undistorted image using an inverse of the updated BEV homography.

12. The method of claim 11, further comprising adaptively updating the BEV homography by calculating alignment of the camera based on the detected current locations and the prior predicted locations.

13. The method of claim 12, further comprising adaptively updating the BEV homography by determining a plurality of feature alignment values based on the detected current locations and the prior predicted locations.

14. The method of claim 13, further comprising adaptively updating the BEV homography by calculating a deviation measurement of the plurality of feature alignment values.

15. The method of claim 14, further comprising adaptively updating the BEV homography by calculating a function of the plurality of feature alignment values when the deviation measurement is less than a predetermined threshold.

16. The method of claim 15, further comprising:
   using the function to update one of the BEV homography and the updated BEV homography when the deviation measurement is less than a predetermined threshold, and
   not updating one of the BEV homography and the updated BEV homography when the deviation measurement is greater than a predetermined threshold.

17. The method of claim 12, further comprising adaptively updating a feature tracking condition prior to calculating alignment of the camera based on the detected current locations and the prior predicted locations.

18. The method of claim 12, further comprising adaptively updating an enabling condition prior to calculating alignment of the camera based on the detected current locations and the prior predicted locations.

19. The method of claim 11, further comprising using a first ROI during one portion of an alignment iteration and a second ROI during another portion of an alignment iteration, wherein the first ROI is different than the second ROI.

20. The method of claim 11, further comprising using an adaptive variable based on a default variable, a relaxed variable, a number of results generated, and a predetermined number of results for adaptation.

* * * * *